(12) United States Patent
Wimmer

(10) Patent No.: US 12,118,025 B2
(45) Date of Patent: Oct. 15, 2024

(54) COMPREHENSION ENGINE TO COMPREHEND CONTENTS OF SELECTED DOCUMENTS

(71) Applicant: IHC Invest, Inc., Road Town (VG)

(72) Inventor: Carl P. Wimmer, Guadalajara (MX)

(73) Assignee: IHC INVEST, INC., Tortola (VG)

( * ) Notice: Subject to any disclaimer, the term of this patent is extended or adjusted under 35 U.S.C. 154(b) by 0 days.

(21) Appl. No.: 18/031,137

(22) PCT Filed: Nov. 17, 2021

(86) PCT No.: PCT/IB2021/060629
§ 371 (c)(1),
(2) Date: Apr. 10, 2023

(87) PCT Pub. No.: WO2022/091074
PCT Pub. Date: May 5, 2022

(65) Prior Publication Data
US 2024/0028630 A1      Jan. 25, 2024

Related U.S. Application Data

(60) Provisional application No. 63/106,802, filed on Oct. 28, 2020.

(51) Int. Cl.
*G06F 16/338* (2019.01)
*G06F 16/33* (2019.01)
*G06F 16/332* (2019.01)

(52) U.S. Cl.
CPC ........ *G06F 16/338* (2019.01); *G06F 16/3328* (2019.01); *G06F 16/3334* (2019.01); *G06F 16/3344* (2019.01)

(58) Field of Classification Search
CPC .............. G06F 16/338; G06F 16/3328; G06F 16/3334; G06F 16/3344; G06F 16/313; G06F 16/904; G06F 16/954; G06F 16/957
See application file for complete search history.

(56) References Cited

U.S. PATENT DOCUMENTS

| 6,701,318 B2 * | 3/2004 | Fox ........................ G06F 16/338 707/706 |
| 7,496,567 B1 * | 2/2009 | Steichen ............... G06F 16/353 715/255 |

(Continued)

OTHER PUBLICATIONS

Yang, Jeong Rok (KR Authorized Officer) PCT International Search Report & Written Opinion issued Feb. 23, 2022 in corresponding International Application No. PCT/IB2021/060629, 9 pages total.

(Continued)

*Primary Examiner* — Jared M Bibbee
(74) *Attorney, Agent, or Firm* — MH2 TECHNOLOGY LAW GROUP LLP

(57) ABSTRACT

A method, a computing system, and a non-transitory computer-readable medium are provided for performing operations. According to the operations, a computing system receives at least one query term. In response to the receiving of the at least one query term, the computing system executes a query based on the received at least one query term. The computing system receives a selection of one or more documents from a query result produced by the executed query. A payload is provided for each of the selected one or more documents for display. The computing system executes a sort, analysis or visualization of the payload for each of the selected one or more documents. An assisted generation of at least one from a group of knowl- (Continued)

edge, comments, and considerations is provided based on the selected one or more documents. Results of the assisted generation are exported.

24 Claims, 14 Drawing Sheets

(56) References Cited

U.S. PATENT DOCUMENTS

| | | | | |
|---|---|---|---|---|
| 2006/0074868 A1* | 4/2006 | Khaliq | ................ | G06F 16/9538 |
| 2011/0307783 A1* | 12/2011 | Robert | ................ | G06F 3/04842 |
| | | | | 715/716 |
| 2012/0209847 A1* | 8/2012 | Rangan | ............... | G06F 16/3347 |
| | | | | 707/769 |
| 2012/0221553 A1* | 8/2012 | Wittmer | ................ | G06F 16/904 |
| | | | | 707/E17.014 |
| 2013/0151497 A1* | 6/2013 | Khaliq | ................ | G06F 16/9538 |
| | | | | 707/706 |
| 2020/0066259 A1* | 2/2020 | Cronin | .................. | G10L 15/083 |
| 2022/0027373 A1* | 1/2022 | Trenkle | ................ | G06F 16/242 |

OTHER PUBLICATIONS

Chatel, C. (Authorized Officer) PCT International Preliminary Report on Patentability issued May 11, 2023 in corresponding International Application No. PCT/IB2021/060629, 7 pages total.

\* cited by examiner

COMPREHENSION ENGINE TO COMPREHEND CONTENTS OF SELECTED DOCUMENTS

This application is the U.S. national phase of PCT Application No. PCT/IB2021/060629 filed in the International Bureau Receiving Office on Nov. 17, 2021, which claims the benefit of U.S. Provisional Patent Application No. 63/106,802 filed in the U.S. Patent and Trademark Office on Oct. 28, 2020, the content of which is hereby incorporated by reference herein in its entirely.

BACKGROUND

A search engine is a software system that is designed to carry out search (e.g., an Internet search or search of any other type of database) in a systematic way for particular information specified in a textual search query. The search results are generally presented in a line of results, often referred to as search engine results pages (SERPs). The information may be a mix of links to web pages, images, videos, infographics, articles, research papers, and other types of files. Some search engines also mine data available in databases or open directories.

JavaScript Object Notation (JSON) is an open standard file format and data interchange format that uses human-readable text to store and transmit data objects consisting of attribute-value pairs and array data types (or any other serializable value). The JSON format has a diverse range of applications, such as serving as a replacement for XML in AJAX systems. JSON is a language-independent data format, derived from JavaScript, but many modern programming languages include code to generate and parse JSON-format data.

SUMMARY

In a first aspect, a computer-implemented method is provided. According to the method, a computing system receives at least one query term. In response to the receiving of the at least one query term, a query is executed based on the received at least one query term. A selection of one or more documents from a query result produced by the executed query is received by the computing system. The computing system provides a payload for each of the selected one or more documents for display and executes a sort, analysis or visualization of the payload for each of the selected one or more documents. An assisted generation of one or more of knowledge, comments, and considerations is provided based on the selected one or more documents. The computing system exports results of the assisted generation.

In a second aspect, a computing system is provided. The computing system includes at least one processor and a memory connected with the at least one processor. The memory includes instructions for the processor to perform operations. According to the operations, at least one query term is received. A query based on the received at least one query term is executed. A selection of one or more documents from a query result produced by the executed query is received and a payload is provided for each of the selected one or more documents for display. A sort, analysis or visualization of the payload for each of the selected one or more documents is executed by the computing system. The computing system provides an assisted generation of one or more of knowledge, comments, and considerations based on the selected one or more documents, and results of the assisted generation are exported.

In a third aspect, a non-transitory computer-readable storage medium is provided that has instructions recorded thereon for at least one processor of a computing device to be configured to perform operations. According to the operations, at least one query term is received and a query based on the received at least one query term is executed. A selection of one or more documents from a query result produced by the executed query is received. A payload is provided for each of the selected one or more documents for display. A sort, analysis or visualization of the payload for each of the selected one or more documents is executed. An assisted generation of one or more from a group of knowledge, comments, and considerations based on the selected one or more documents is provided. User input is received regarding a visualization of one of the selected one or more documents. A new visualization of the one of the selected one or more documents is produced based on the received user input regarding the visualization and the new visualization is exported.

DETAILED DESCRIPTION

Figure 1:
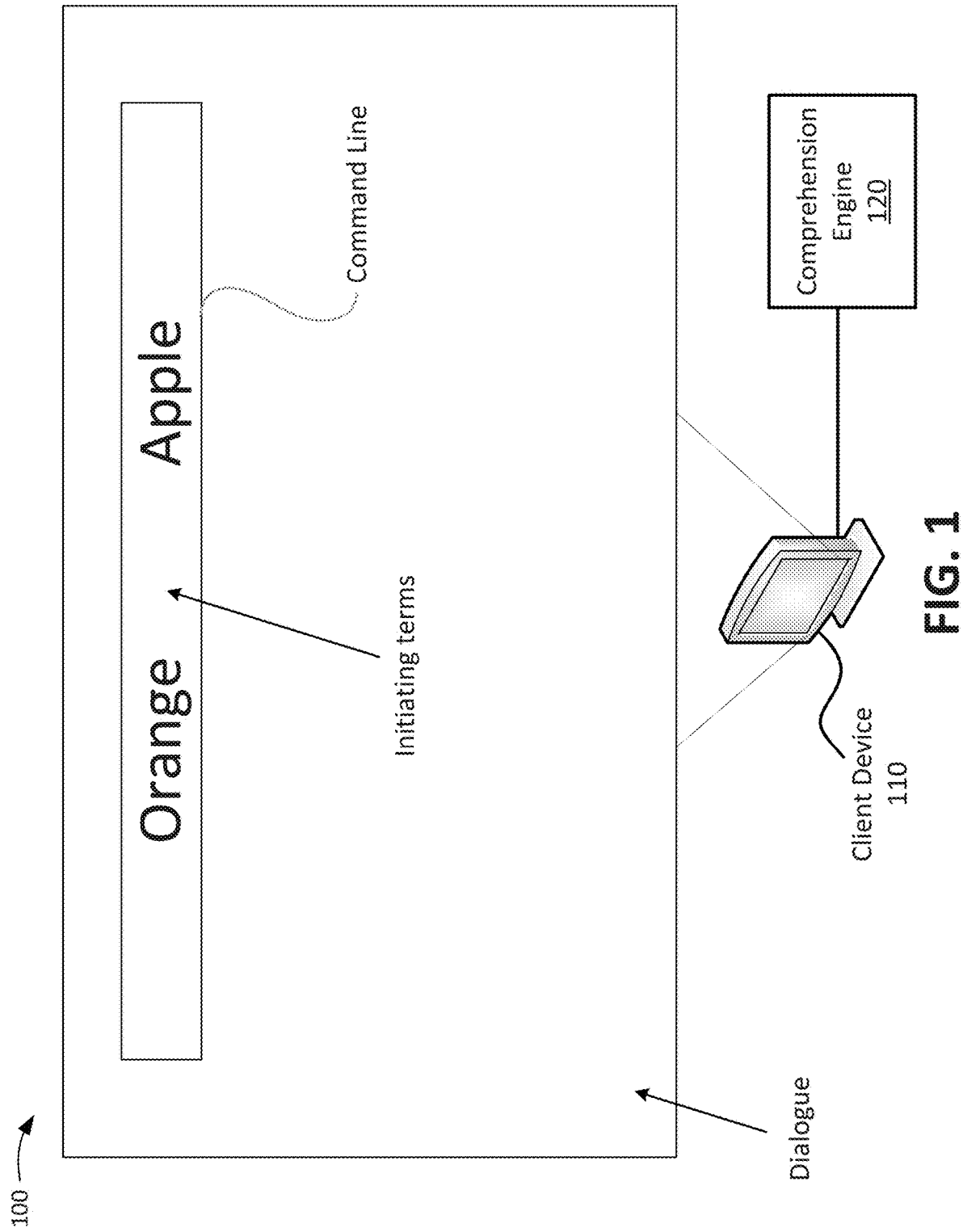
FIG. 1 illustrates an overview of an example implementation as described herein.

Search engines may be useful for finding and delivering content, such as documents, to a user based on one or more query terms inputted by the user. While search engines may effectively find and rank documents in order of pertinence, search engines lack the ability to comprehend the contents of query results. Accordingly, aspects of the present disclosure focus on a next level, i.e., a comprehension level, forming a system of user information, comprehension and creative comment journey. In other words, aspects of the present disclosure provide automated knowledge generation. In some embodiments, aspects of the present disclosure may include Comprehension Engine (CE) that extends the capabilities of search engines by analyzing a knowledge payload and assisting in the sorting, analysis and visualization of the content from any selected document. In some embodiments, the selected document may be identified from a search engine in response to a search query that includes one or more query terms, but may also be uploaded to the CE independently of a search engine. In this way, the CE may be used to assist in the sorting, analysis and visualization of the content from a selected document, whether or not that document originated from a query results list.

In some embodiments, aspects of the present disclosure may decompose one or more selected documents by processing the selected documents and returning a JSON object with notes (also referred as knowledge fragments). In some embodiments, the JSON object may include a fully qualified frame of reference enabling any computer to read that document similar to a human reader. In this way, human intuition and creativity may be combined with the thoroughness and speed capabilities of a computer.

In some embodiments, aspects of the present disclosure may be incorporated into a an existing web browser in which source code of the browser is available. In some embodiments, aspects of the present disclosure may be incorporated into a word processor and/or a software tool. In some embodiments, a link to a decomposer may be added, as well as tabs for different varieties of sorting, analysis and visualization ("SAV") techniques. Further, the final CE output may be exported in a variety of formats (e.g., print, saved/stored as a file, posted to social media, e-mailed, etc.).

Certain embodiments of the disclosure will hereafter be described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current disclosure.

Embodiments of the disclosure may include a system, a method, and/or a non-transitory computer-readable storage medium at any possible technical detail level of integration. The non-transitory computer readable storage medium (or media) has computer readable program instructions stored thereon for causing a processor to carry out aspects of the present disclosure.

FIG. 1 illustrates an overview of an example implementation in accordance with aspects of the present disclosure. As shown in FIG. 1, a client device 110 (e.g., a desktop, computing device, portable computing device, tablet, smart phone, etc.) may present a use interface 100 (e.g., within an application or browser hosted by the client device 110). In some embodiments, the interface 100 may include a command line within a dialogue box in which a user may input initiating search query terms (e.g., "orange" and "apple"). As further shown in FIG. 1, the client device 110 may communicate with a comprehension engine 120 which may execute one or more processes consistent with aspects of the present disclosure based on user inputs received by the client device 110.

Figure 2:
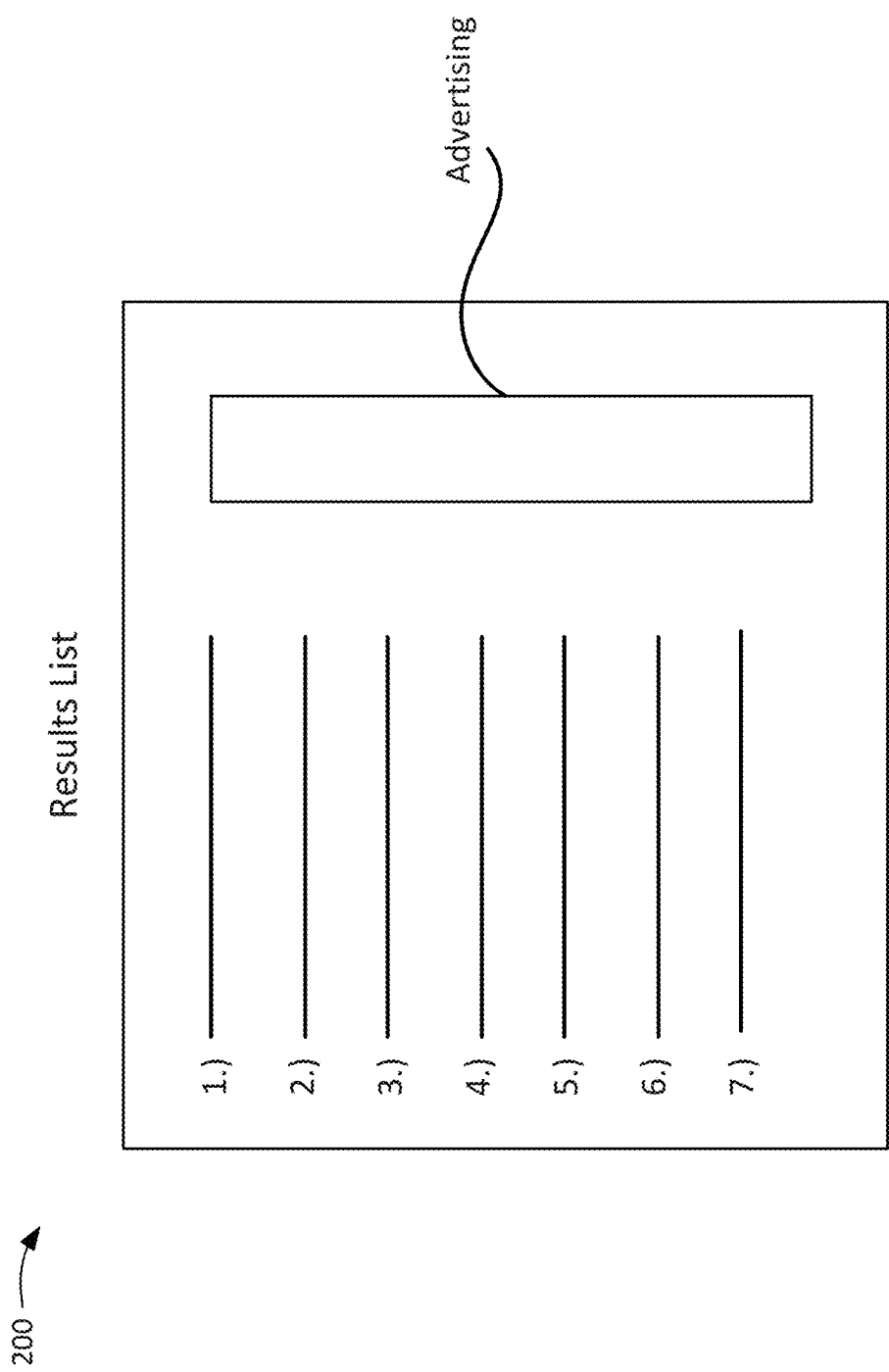
FIG. 2 illustrates an example results list of documents returned based on search query terms from FIG. 1.

FIG. 2 illustrates an example results list of documents returned based on the search query terms from FIG. 1. The results list may be presented in a user interface 200 as shown, and the user may select one or more documents from the results list. As further shown in FIG. 2, the results list may include a section to present advertising content.

Figure 3:
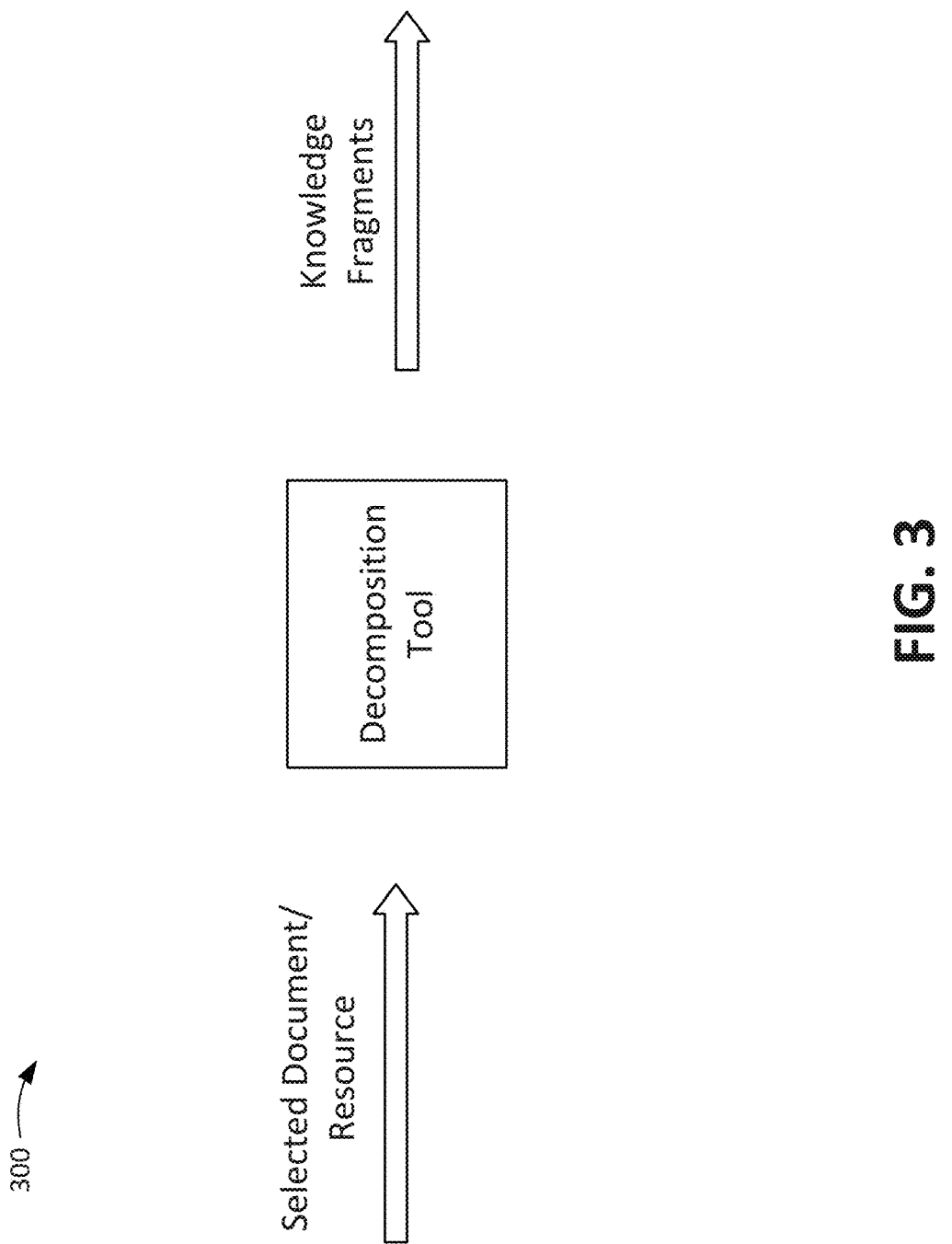
FIG. 3 illustrates an example diagram of a decomposition function performed by a decomposition tool.

FIG. 3 illustrates an example diagram of a decomposition function performed by a decomposition tool. More specifically, the decomposition tool may receive one or more documents selected by the user from the results list of FIG. 2. Alternatively, the decomposition tool may receive one or more selected documents uploaded to the decomposition tool. The decomposition tool may process the one or more selected documents and output knowledge fragments in the form of a JSON object having notes associated with the selected documents. In some embodiments, the decomposition tool may be implemented and/or hosted by the comprehension engine 120.

In some embodiments, the decomposition tool may submit a selected document or resource to specific components of a natural language parser. One well-known example includes the GATE Natural Language Processor. GATE stands for "General Architecture for Text Engineering" and is a project of the University of Sheffield in the United Kingdom. GATE has a very large number of components, most of which have no bearing upon the present invention. One embodiment of the current invention utilizes a small subset of GATE components-a Serial Analyzer (called the "ANNIE Serial Analyzer"), a Document of Sentences, and a Tagger (called the "Hepple Tagger") to extract Sentence+Token Sequence Pairs. The Sentence+Token Sequence Pairs are utilized by the decomposition tool.

The set of Sentence+Token Sequence Pairs are produced in GATE as follows: The Serial Analyzer extracts "Sentences" from an input Document. The "Sentences" do not need to conform to actual sentences in an input text, but often do. The sentences are "aligned" in a stack termed a Document of Sentences. Each Sentence in the Document of Sentences is then run through the Tagger which assigns to each word in the Sentence a part of speech token. The parts of speech are for the most part the same parts of speech well known to school children, although among Taggers, there is no standard for designating tokens. In the Hepple Tagger, a singular Noun is assigned the token "NN", an adjective is assigned the token "JJ", an adverb is assigned the token "RB" and so on. Sometimes, additional parts of speech are created for the benefit of downstream uses. The part of speech tokens are maintained in a token sequence which is checked for one-to-one correspondence with the actual words of the sentence upon which the token sequence is based.

There are several uses for part of speech patterns and token seeking rules documented in the literature of Information Extraction, the domain with which the current invention is associated, and in the related field of Information Retrieval. Text analysis for the purpose of automated document classification or indexing for search engine-based retrieval is a primary use of part of speech patterns. Part of speech patterns and token seeking rules are used in text analysis to discover keywords, phrases, clauses, sentences, paragraphs, concepts and topics. Although the meanings of keyword, clause, sentence, and paragraph conform to the common understanding of the terms, the meanings of phrase, concept, and topic varies by implementation. Sometimes, the word phrase is defined using its traditional meaning in grammar. In this use, types of phrases include Prepositional Phrases (PP), Noun Phrases (NP), Verb Phrases (VP), Adjective Phrases, and Adverbial Phrases. For other implementations, the word phrase may be defined as any proper name (for example "New York City"). Most definitions require that a phrase contain multiple words, although at least one definition permits even a single word to be considered a phrase. Some search engine implementations utilize a lexicon (a pre-canned list) of phrases. The WordNet Lexical Database is a common source of phrases.

The word concept generally refers to one of two constructs. The first construct is concept as a cluster of related words, similar to a thesaurus, associated with a keyword. In a number of implementations, this cluster is made available to a user—via a Graphic User Interface (GUI) for correction and customization. The user can tailor the cluster of words until the resulting concept is most representative of the user's understanding and intent. The second construct is concept as a localized semantic net of related words around a keyword. Here, a local or public ontology and taxonomy is consulted to create a semantic net around the keyword. Some implementations of concept include images and other non-text elements. Topics in general practice are to be identified or "detected" from applying a specific set of operations against a body of text. Different methodologies for identification and/or detection of topics have been described in the literature. The knowledge fragments generated by the current invention cannot be classified as concepts or topics using the well know definitions of these terms, except by serendipitous execution of the described functions.

In the prior art, use of part of speech pattern examination is applied within boundaries of an individual text (intralinguistic), to resolve endophoric ambiguity. For example, in the text, "I had a professor who always carried an umbrella. He never opened it even when it rained.", the second sentence is endophora because it refers to something (the professor) who was mentioned earlier in the text but is not clearly named in the second sentence. Likewise, one "it" in the second sentence refers to "umbrella" in the first sentence. For those applications which require determining what a document "is about", such use of part of speech patterns is critical. A token seeking rule which might be applied in this case—when processing the second sentence might be to "go back" to find the noun in the first sentence to which the "He" (or the "it") in the second sentence applies. Constraints described herein do not mirror the token seeking rules present in the prior art except in the most abstract of characteristics. The constraints cannot be used to identify keywords, phrases, clauses, sentences, concepts or topics. The patterns crafted for the present invention cannot be used to identify keywords, phrases, clauses, sentences, concepts or topics in the formally accepted structures of instantiations of those terms. Further, the patterns and constraints required for the current invention differ from those required for U.S. patent application Ser. Nos. 11/273,568 and 11/314,835. The fundamental difference is that the pattern and constraints are designed and intended to produce optimally correlatable knowledge fragments, such knowledge fragments ideally capturing a relation (value of a bond) between the values of a subject and an attribute. The present invention sets no such standard for node creation, but instead, establishes patterns and constraints which can ultimately produce knowledge fragments at machine speed.

The two methods of resource decomposition applied in current embodiments of the present invention are word classification and intermediate format. Word classification identifies words as instances of parts of speech (e.g. nouns, verbs, adjectives). Correct word classification often requires a text called a corpus because word classification is dependent upon not what a word is, but how it is used. Although the task of word classification is unique for each human language, all human languages can be decomposed into parts of speech. The human language decomposed by word classification in the preferred embodiment is the English language, and the means of word classification is a natural language parser (NLP) (e.g. GATE, a product of the University of Sheffield, UK).

Decomposition by means of word classification being only one of two methods for decomposition supported by the present invention, the other means of decomposition is decomposition of the information from a resource using an intermediate format. The intermediate format is a first term or phrase paired with a second term or phrase. In a preferred embodiment, the first term or phrase has a relation to the second term or phrase. That is, the first term or phrase, known as a first relatum, has a relation or bond with the second term or phrase, known as a second relatum. That relation is either an implicit relation or an explicit relation, and the relation is defined by a context. In one embodiment, that context is a schema. In another embodiment, the context is a tree graph. In a third embodiment, that context is a directed graph (also called a digraph). In these embodiments, the context is supplied by the resource from which the pair of terms or phrases was extracted. In other embodiments, the context is supplied by an external resource. In accordance with one embodiment of the present invention, where the relation is an explicit relation defined by a context, that relation is named by that context.

In one example embodiment, the context is a schema, and the resource is a relational database (RDB). The relation from the first term or phrase to the second term or phrase is an implicit relation, and that implicit relation is defined in an RDB. The decomposition method supplies the relation with the pair of concepts or terms, thereby creating a knowledge fragment. The first term is a phrase, meaning that it has more than one part (e.g. two words, a word and a numeric value, three words), and the second term is a phrase, meaning that it has more than one part (e.g. two words, a word and a numeric value, three words).

The decomposition function takes as input the RDB schema. The method includes:
(A) A first phase, where
  (a) the first term or phrase is the database name, and the second term or phrase is a database table name. Example: database name is "ACCOUNTING", and database table name is "Invoice";
  (b) The relation (e.g. "has") between the first term or phrase ("ACCOUNTING") and the second term or phrase ("Invoice") is recognized as implicit due to the semantics of the RDB schema;
  (c) A knowledge fragment is produced ("Accounting—has—Invoice") by supplying the relation or bond ("has") between the pair of concepts or terms known as relata;
  (d) For each table in the RDB, the steps (a) fixed as the database name, (b) fixed as the relation, (c) where the individual table names are iteratively used, produce a knowledge fragment; and
(B) a second phase, where
  (a) the first term or phrase is the database table name, and the second term or phrase is the database table column name. Example: database table name is "Invoice" and column name is "Amount Due";

(b) The relation (e.g. "has") between the first term or phrase ("Invoice") and the second term or phrase ("Amount Due") is recognized as implicit due to the semantics of the RDB schema;

(c) A knowledge fragment is produced ("Invoice—has—Amount Due") by supplying the relation ("has") between the pair of concepts or terms;

(d) For each column in the database table, the steps (a) fixed as the database table name, (b) fixed as the relation, (c) where the individual column names are iteratively used, produce a knowledge fragment;

(e) For each table in the RDB, step (d) is followed, with the steps (a) where the database table names are iteratively used, (b) fixed as the relation, (c) where the individual column names are iteratively used, produce a knowledge fragment;

In this embodiment, the entire schema of the RDB is decomposed, and because of the implicit relationship being immediately known by the semantics of the RDB, the entire schema of the RDB can be composed into nodes without additional processing of the intermediate format pair of concepts or terms.

Figure 4:
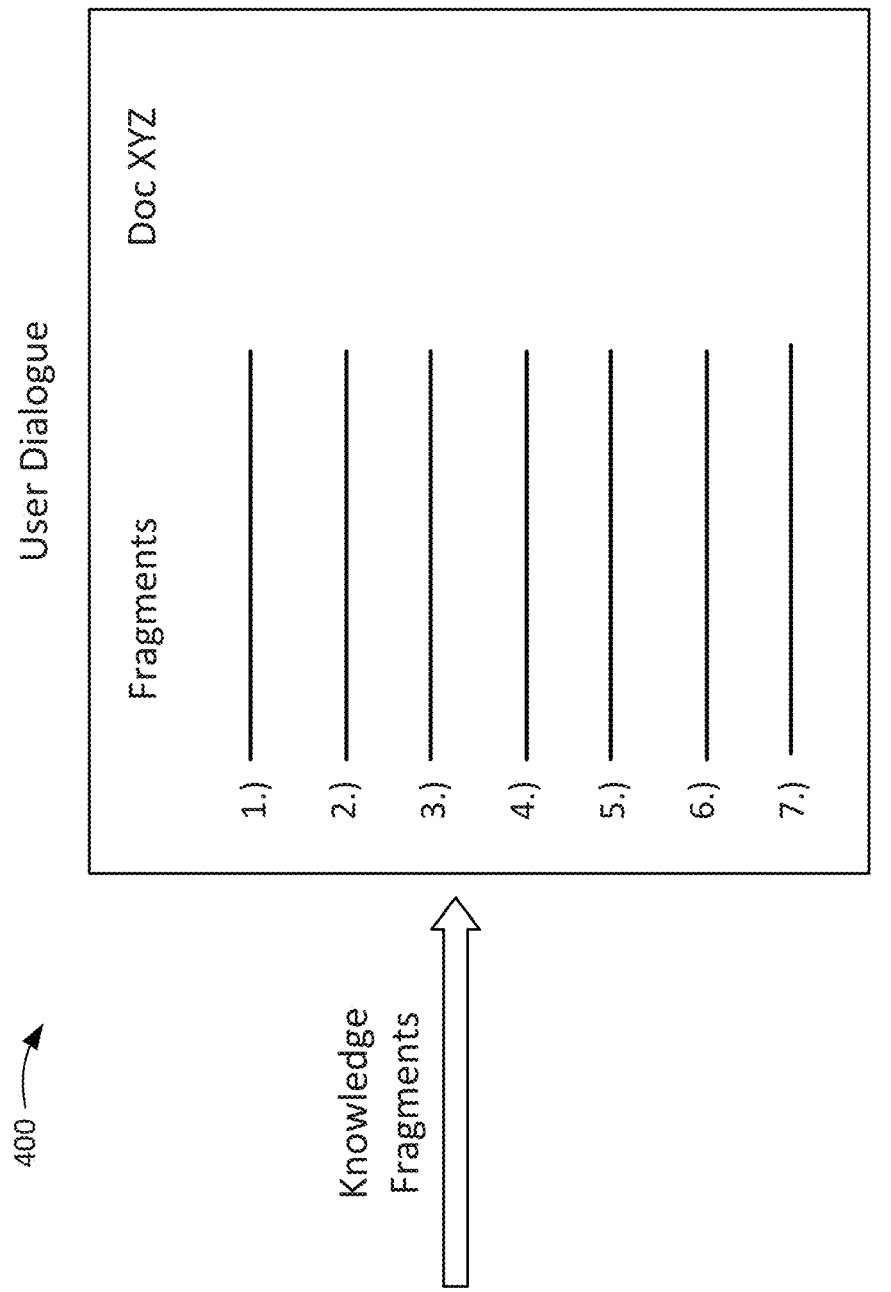
FIG. 4 illustrates an example of payload returned by the comprehension engine based on the knowledge fragments from FIG. 3.

FIG. 4 illustrates an example of payload returned by the comprehension engine based on the knowledge fragments from FIG. 3. In this way, the user may view a visual representation of the comprehension engine's results or payload.

Figure 5:
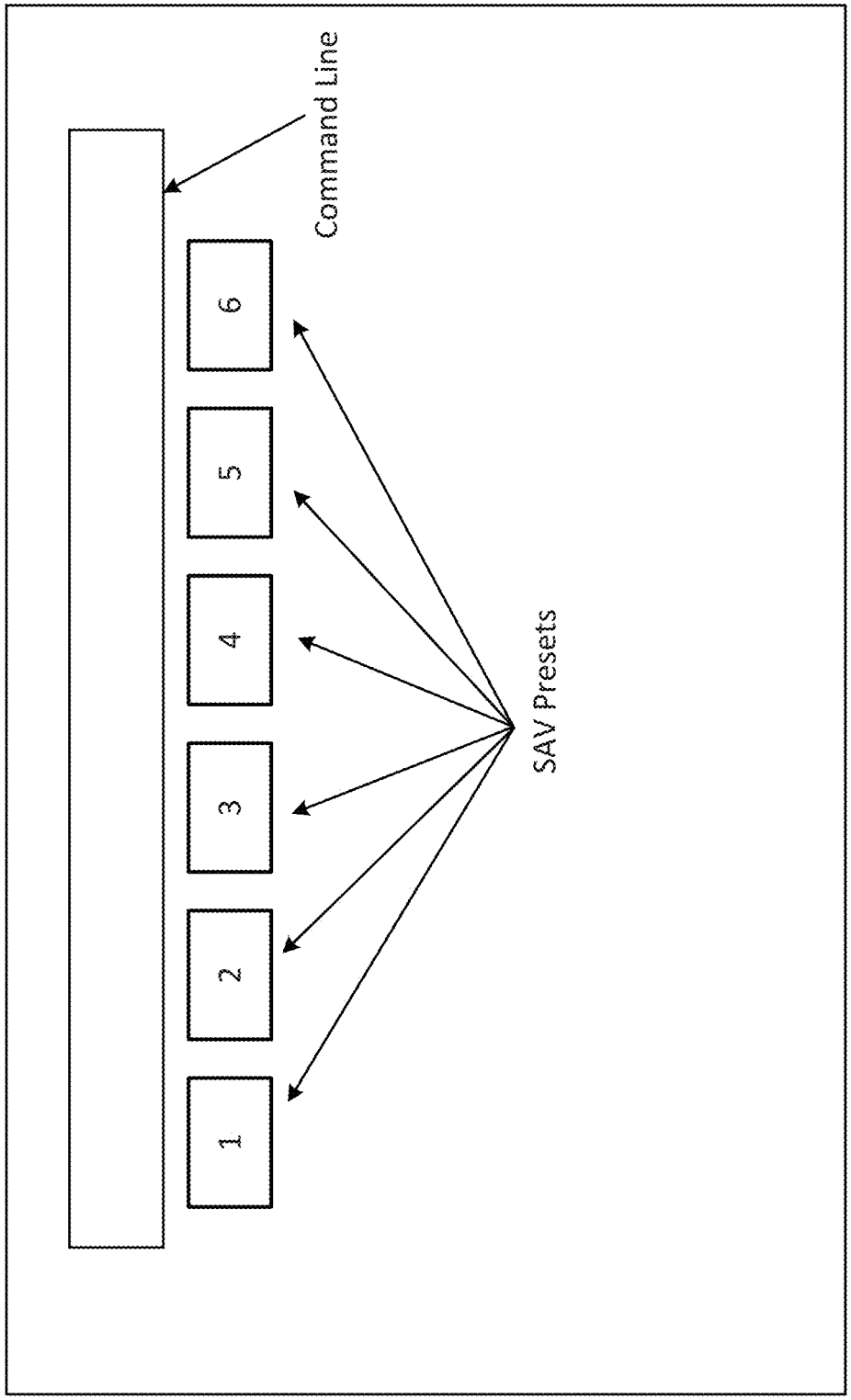
FIG. 5 illustrates a sorting analysis visualization (SAV) function.

FIG. 5 illustrates a sorting analysis visualization (SAV) function. As shown FIG. 5, the CE interface may include any number of SAV presets in which each preset may define the manner in which the CE payload is analyzed, sorted, or presented. Each SAV preset may be user or developer defined and modifiable. The presets may be stored by the CE and/or in another location. The SAV function may analyze the CE payload and form a visual network that models an interpretation or comprehension of the CE payload. In one example embodiment, relations may be assigned a weight. One example preset may include a filter to filter out relations that have a weight less than a given value such that those relations having weights less than the given value are hidden in a produced visualization. Another example preset may cause a visualization of an approximately centrally-located prime focus to be generated showing related relata having a direct or indirect relation with the approximately centrally-located prime focus. Other presets may be included in other embodiments.

Figure 6:
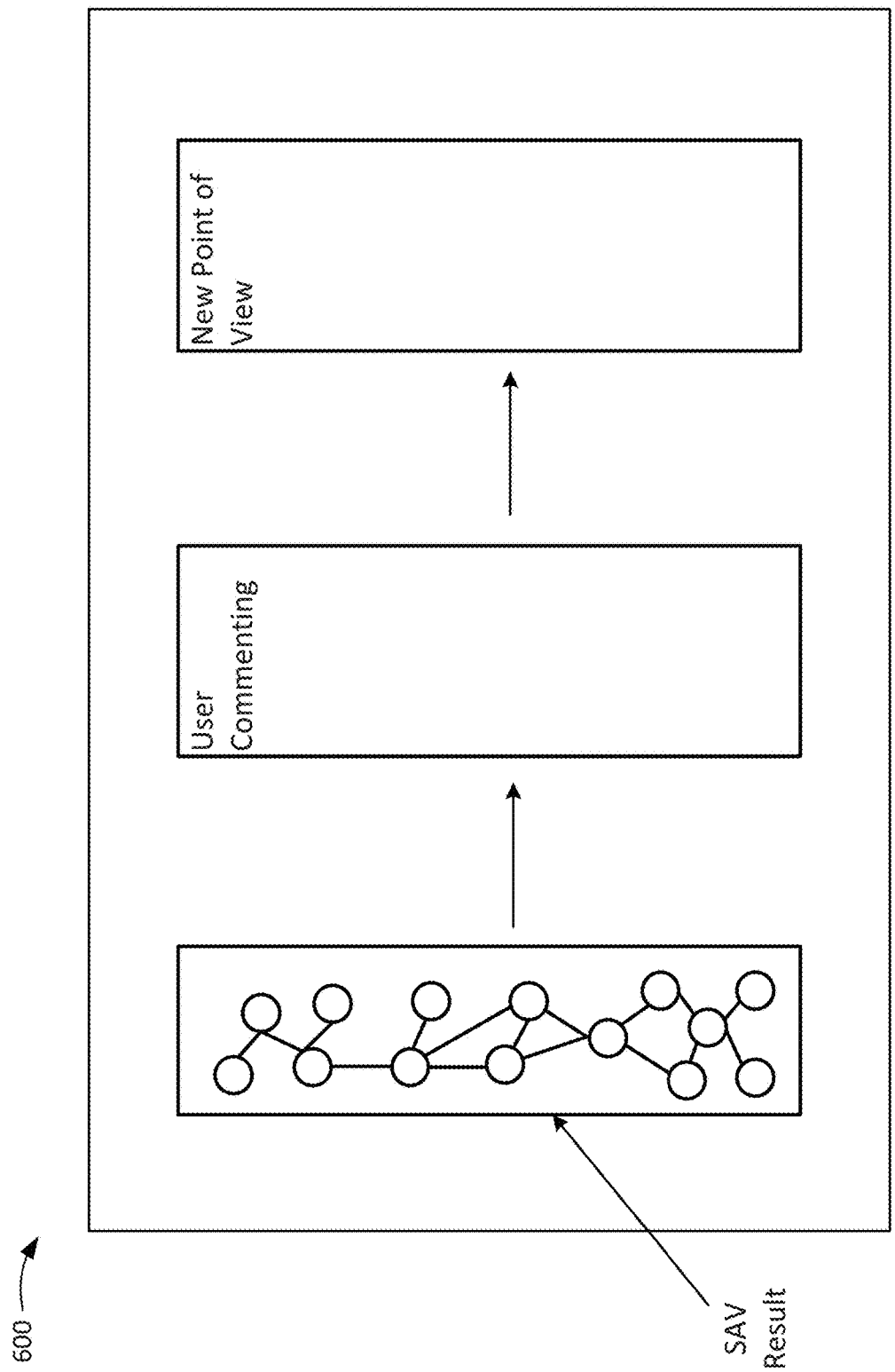
FIG. 6 illustrates a process for commenting on sorted, analyzed, or visualized CE payload to form a new point of view or interpretation/comprehension based on user comments.

FIG. 6 illustrates a process for commenting on sorted, analyzed, and visualized CE payload to form a new point of view or interpretation/comprehension based on user comments. As shown in FIG. 6, interface 600 may present the SAV result produced at FIG. 5. The user may comment on the SAV result, and based on the user's comments, a new point of view or interpretation/comprehension of the CE payload may be generated.

As previously mentioned, each knowledge fragment includes a first relatum, a second relatum, and a relation between the first relatum and the second relatum. "Dog has fur", "cat has whiskers", "boy throws ball", and "man bites dog" are examples of knowledge fragments. In the knowledge fragment "dog has fur", the first and second relatum, respectively, are "dog" and "fur" and the relation is "has". In the knowledge fragment "cat has whiskers", the first and second relatum, respectively, are "cat" and "whiskers" and the relation is "has". In the knowledge fragment "boy throws ball", the first and second relatum, respectively, are "boy" and "ball" and the relation is "throws". In the knowledge fragment "man bites dog", the first and second relatum, respectively, are "man" and "dog" and the relation is "bites".

A prime focus is a collection of consecutive sentences in which a particular first relata has a frequency of occurrence greater than a frequency of occurrence of any other first relata included in knowledge fragments of the collection of sentences. In some embodiments, equivalent first relata may be treated as a same first relatum. For example, in some embodiments, first relata "dog" and "canine" may be treated as a same first relata having either a value of "dog" and/or "canine". In this specification, two relata may be defined as equal if both relata either have a same value or have values that are considered to be equivalent.

A prime focus may be linked to one or more other prime foci and/or may be linked to one or more subsidiary foci. A subsidiary focus is a first relatum that is not a prime focus.

Various embodiments may process contents of a document and present a visualization showing prime foci, related subsidiary foci, and paths indicating relations therebetween to provide a user with an understanding of the contents in a very short period of time.

Figure 7:
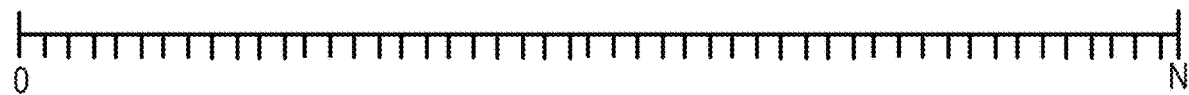
FIG. 7 illustrates an example visual presentation of N sentences included in contents of a document that was provided for analysis.
Figure 8:
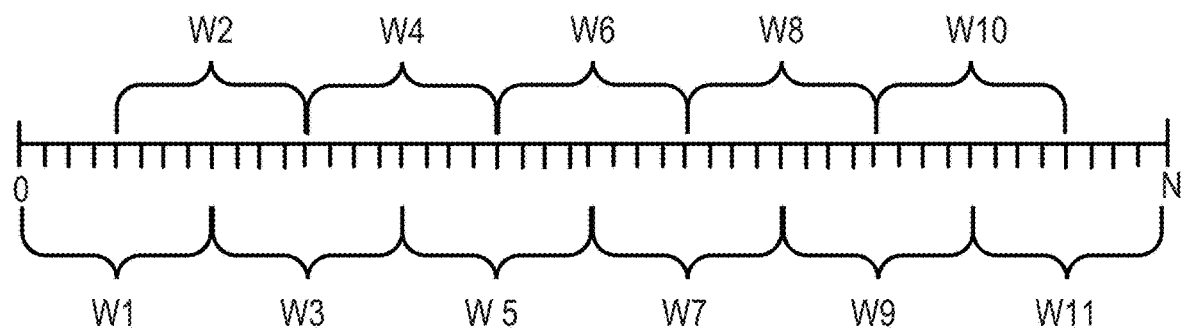
FIG. 8 shows an example document divided into multiple windows for analysis.

In an embodiment, as shown in FIG. 7, a computing device may prepare a visual presentation of N sentences included in contents of a document provided for analysis. The computing device may divide the sentences into a number of sections, or windows, which may overlap. As shown in FIG. 8, an example document may be divided into 11 windows, W1 through W11, each window having eight sentences, and each following window including some of the sentences from an immediately preceding window. For example, FIG. 8 shows window W1 having a first eight sentences of the document, window W2 having eight sentences beginning with a last four sentences of window W1, window W3 having eight sentences beginning with a last four sentences of window W2, window W4 having eight sentences beginning with a last four sentences of window W3, etc. In this example, when a number of remaining sentences not yet assigned to a window are less than half of a window size, then the remaining sentences may be included in a last window of the document such that the last window includes the number of remaining sentences and a last number of sentences from an immediately preceding window such that a window size of the last window has a same window size as other windows of the document. In other embodiments, windows may have a varying number of sentences.

Although the example shown in FIG. 8 has windows of eight sentences with windows overlapping adjacent windows by half of a window size, other embodiments may divide a document into windows having a different number of sentences and with a different number of sentences overlapping adjacent windows.

Figure 9:
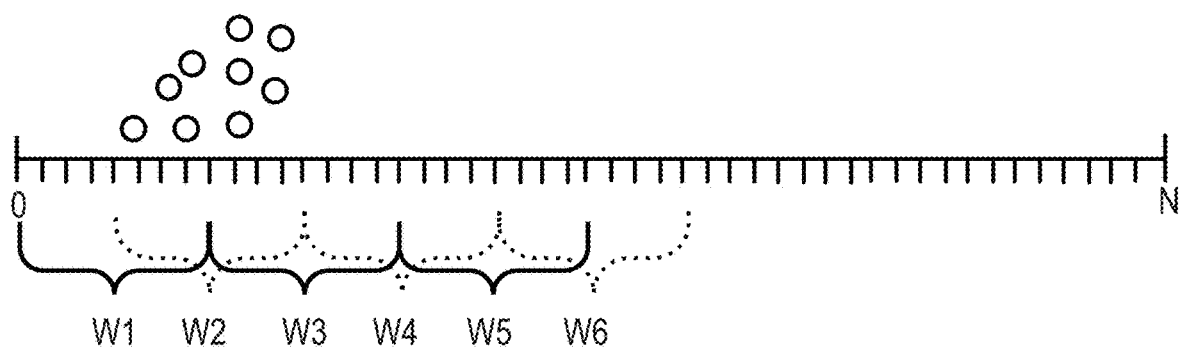
FIG. 9 illustrates at least some of the windows of FIG. 8 having first relata, shown as small circles, with a same or equivalent values in knowledge fragments of sentences included in corresponding windows of a document.

FIG. 9 shows window W1 having four first relata (shown as small circles) with a same or equivalent values in knowledge fragments of sentences included in the window W1. Assuming that the four first relata outnumber a frequency of other first relata with other values in knowledge fragments of sentences included in the window W1, then the value(s) of these four first relata may become a prime focus candidate. Sliding a current window to adjacent window W2, which overlaps with the window W1, five more first relata are detected having the same or the equivalent values with respect to the four first relata of window W1. Thus, window W2 has nine first relata with the same or the equivalent values. Assuming that the same or the equivalent values of these first relata occur more frequently than other values of other first relata in windows W1 and W2, then the same or the equivalent values of the nine first relata become the prime focus in windows W1 and W2.

Figure 10:
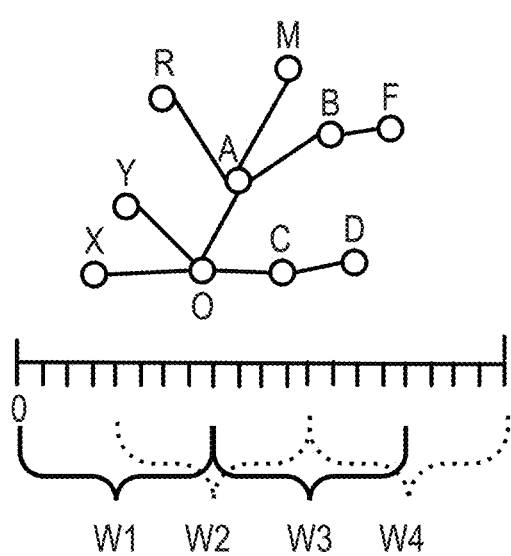
FIG. 10 illustrates an example display screen showing a prime focus with relata having either a direct or indirect relation with the prime focus.

Various embodiments may determine a central prime focus of a document. A central prime focus is a prime focus located at an approximate central location of contents of the document. Other first relata having either a direct or indirect relation with the central prime focus may be determined. That is, first relata in knowledge fragments of the document having a related second relatum with a value of the central prime focus are considered to be directly related to the central prime focus. Other first relata in knowledge fragments having a second relatum with a value of a first relatum that is related to another second relatum having a relation through one or more other relata to the central prime focus are considered to be indirectly related to the central prime focus. FIG. 10 shows an example display screen showing a central prime focus O with direct relations to relata X, Y, A and C. Relatum D has an indirect relation with central prime focus O through relatum C. Relata R, M and B have an indirect relation with central prime focus O via relatum A. Relatum F has an indirect relation with central prime focus O via relata B and A. Lines between relatum are paths representing relations between the relatum.

In some embodiments one of the prime foci may be selected from a display such as, for example, a display as shown in FIG. 9 or another display. Other first relata having either a direct or indirect relation with the selected one of the prime foci may be determined. That is, first relata in knowledge fragments of the document having a related second relatum with a value of the selected one of the prime foci are considered to be directly related to the central prime focus. Other first relata in knowledge fragments having a second relatum with a value of a first relatum that is related another second relatum having a relation through one or more other relata to the selected one of the prime foci are considered to be indirectly related to the selected one of the prime foci. If prime focus O is the selected one of the prime foci, then FIG. 10 may be seen as an example display screen showing the selected one of the prime foci O with direct relations to relata X, Y, A and C, an indirect relation with relatum D through relatum C, indirect relations with relata R, M and B via relatum A, and an indirect relation with relatum F via relata B and A. Lines between relata are paths representing relations between the relata.

Figure 11:
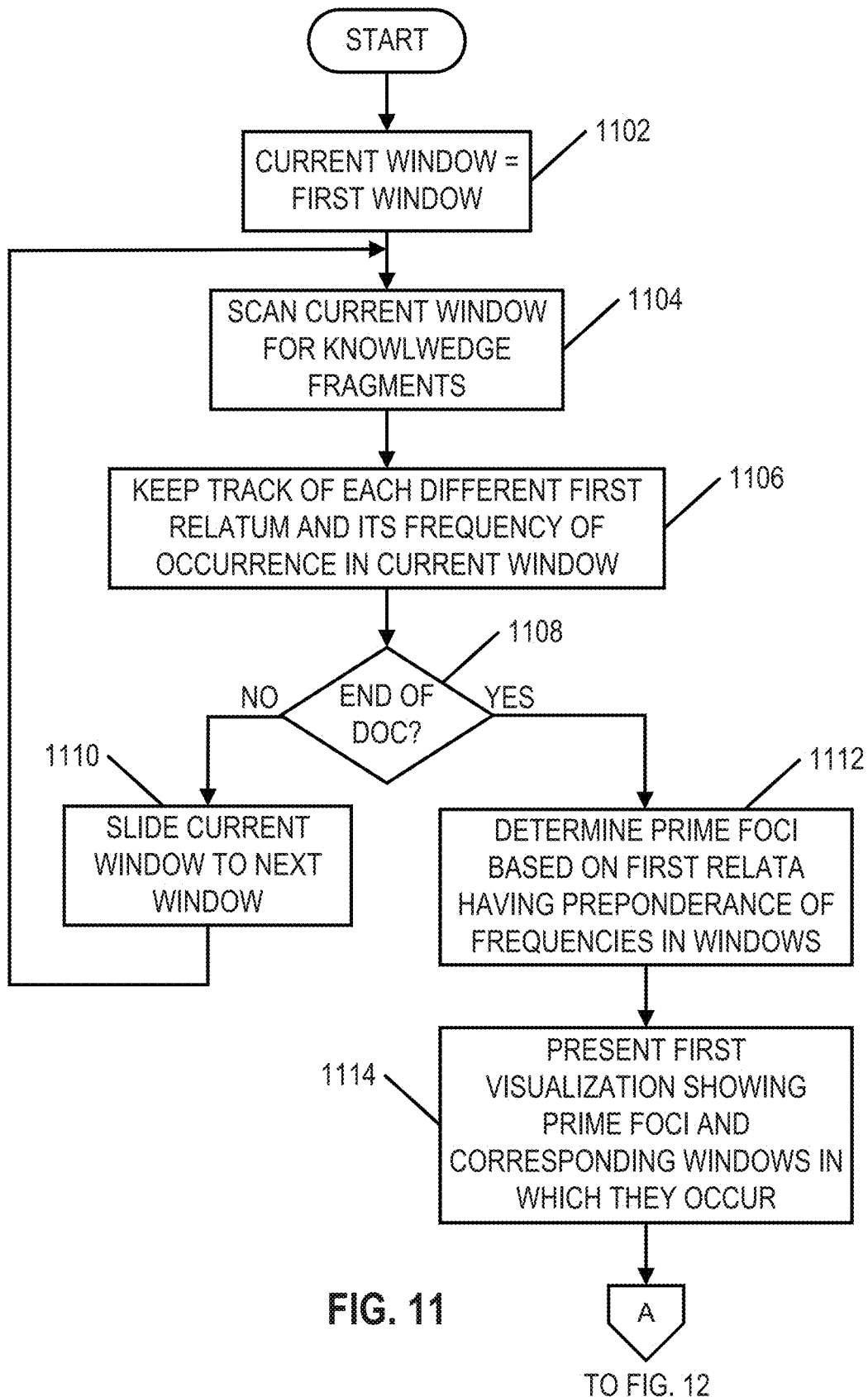
FIGS. 11-12 art flowcharts of an example process for determining a prime focus of a window.
Figure 12:
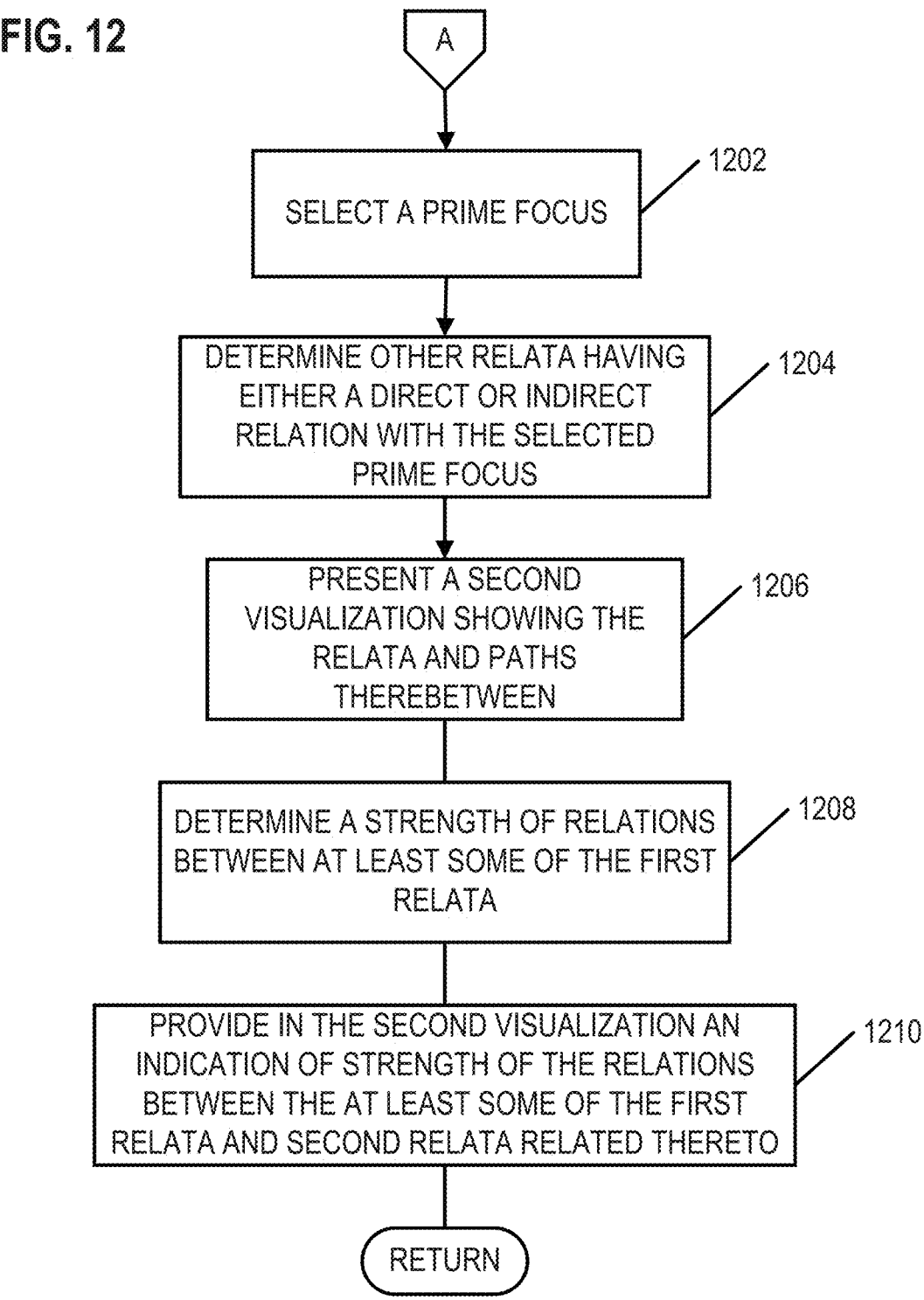

FIGS. 11-12 are flowcharts of an example process that may be implemented in some embodiments for determining a prime focus of a window. The process may begin with setting a current window to a first window at a beginning of contents of a document (act 1102). The current window then may be scanned for knowledge fragments (act 1104) and a list of unique first relata values and equivalents and corresponding frequencies of occurrence in the current window may be determined and maintained (act 1106).

Next, a determination may be made regarding whether an end of the document has been reached (act 1108). If the end of the document has not been reached, then the current window may be slid to a next adjacent window (act 1110) and acts 1104-1108 may be repeated.

If, during act 1108, a determination is made that the end of the document has been reached, then prime foci may be determined for windows based on a first relata value and its equivalent values having a preponderance of frequencies of occurrences in windows (act 1112).

Next, a first visualization may be presented on a display screen showing prime foci and corresponding windows in which they occur (act 1114). In some embodiments, the first visualization may be similar to that shown in FIG. 9. That is, an indication of prime foci in the windows in which they occur may be displayed as circles or other indications. In some embodiments, each indication may be labeled with one or more alphanumeric characters and a legend may be displayed showing each of the labels and a corresponding prime focus value.

Next, a central prime focus may be determined by finding a prime focus in an approximate central portion of contents of a document, or alternatively, a prime focus may be selected via a graphical user interface using a pointing device (act 1202; FIG. 12), which may be a computer mouse, a trackball device, a user's finger on a touch screen, or other type of pointing device. Other relata may be determined having either a direct or indirect relation with the central prime focus, or alternatively, a direct or indirect relation with the selected prime focus, as previously described (act 1204). Other first relata related to the central prime focus, or the selected prime focus, may be considered to be subsidiary foci in subsidiary knowledge fragments. A second visualization may be presented on a display screen showing the central prime focus (or the selected prime focus), related first relata, and paths therebetween (act 1206).

Returning to FIG. 6, the SAV result may show a visualization including a network of related prime and subsidiary foci in contents of a selected document. A user may comment on the visualization by changing or adding prime or subsidiary foci to the visualization and/or changing relations between foci by moving or deleting paths between foci. Such comments may result in a visualization of a new point of view.

Figure 13:
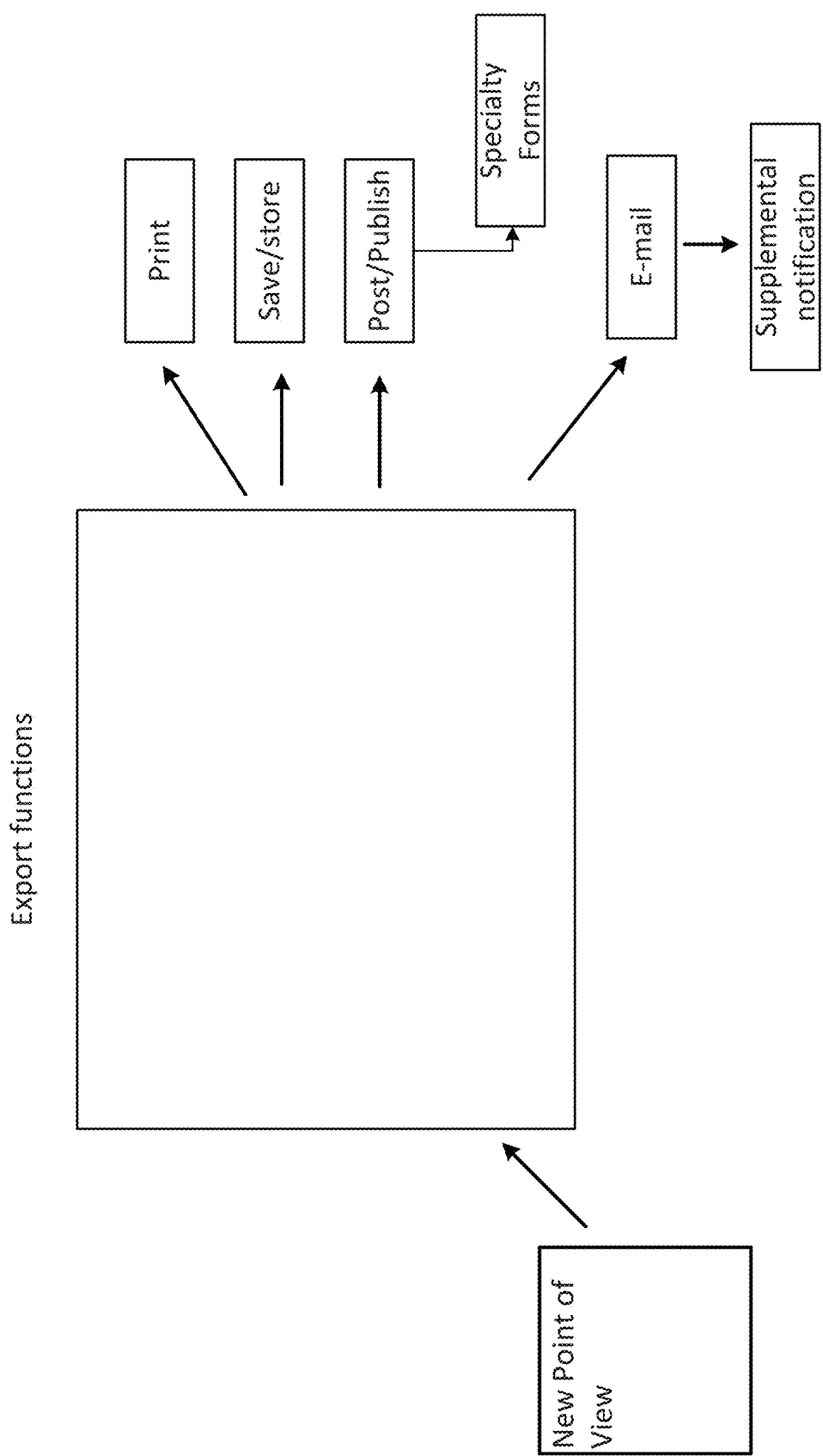
FIG. 13 illustrates an example of export functions that may be implemented in accordance with aspects of the present disclosure.

FIG. 13 illustrates an example of export functions that may be implemented in accordance with aspects of the present disclosure. As shown in FIG. 13, the final output (e.g., the new point of view after processing the user's comments) may be exported in a variety of formats (e.g., printing, storing/saving, posting/publishing, such as to specialty forms or social media, e-mail with supplemental notifications, etc.).

Figure 14:
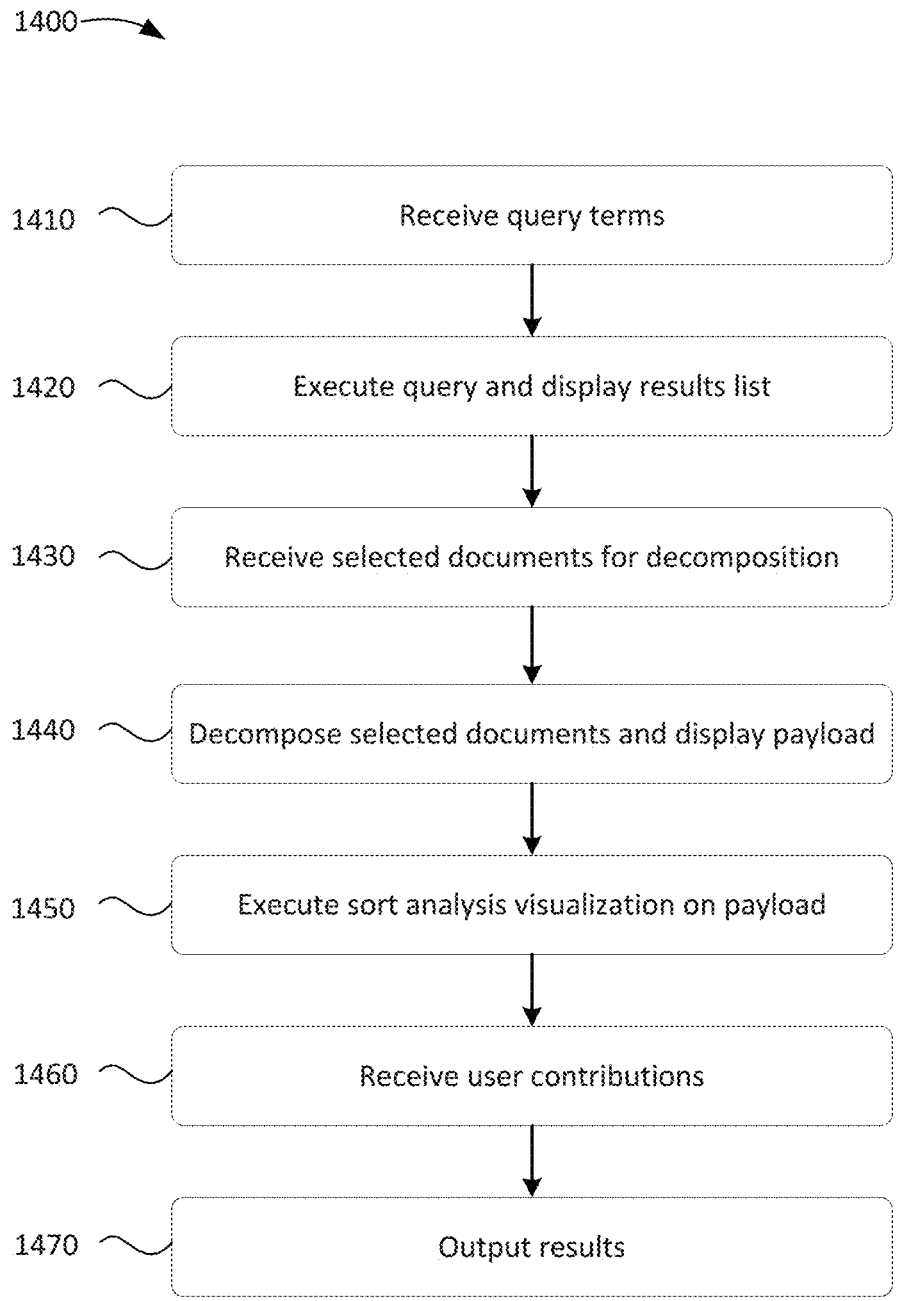
FIG. 14 illustrates an example flowchart of a process for executing a comprehension engine to produce a comprehension of selected documents.

FIG. 14 illustrates an example flowchart of a process for executing a comprehension engine to produce a comprehension of selected documents. The blocks of FIG. 14 may be implemented by the comprehension engine 120. As noted herein, the flowchart illustrates the architecture, functionality, and operation of possible implementations of systems, methods, and computer program products according to various embodiments of the present disclosure.

As shown in FIG. 14, The process 1400 may include receiving one or more query terms (block 1410). For example, the comprehension engine 120 may receive the one or more query terms (e.g., as described above with respect to FIG. 1).

The process 1400 also may include executing a search based on the one or more query terms and displaying a results list (block 1420). For example, the comprehension engine 120 may execute a search using any search algorithm or engine and display the results list (e.g., as described above with respect to FIG. 2).

The process 1400 further may include receiving selected documents for decomposition (block 1430). For example, the comprehension engine 120 may receive a selection of documents for decomposition (e.g., documents selected by the user to be of greatest interest).

The process 1400 also may include decomposing the selected documents and displaying the payload (block 1440). For example, the comprehension engine 120 may decompose the selected documents and display the resulting payload (e.g., as described above with respect to FIGS. 3 and 4).

The process 1400 further may include executing sort, analysis, and visualization (SAV) on the payload (block 1450). For example, the comprehension engine 120 may execute SAV on the payload (e.g., as described above with respect to FIG. 5). In some embodiments, a sort, analysis or visualization technique used may be based on a selected SAV preset.

The process 1400 also may include receiving user contributions (block 1460). For example, the comprehension engine 120 may receive user contributions (e.g., as described above respect to FIG. 6). In some embodiments, the comprehension engine 120 may produce an updated or new point of view (e.g., updated comprehension/interpretation of the payload from block 1430).

The process 1400 further may include outputting results (block 1470). For example, the comprehension engine 120 may output the final results (e.g., the comprehension/interpretation of the payload after the user has commented, as described above with respect to FIGS. 6 and 13).

By introducing the decomposition tool, the process 1400 illustrates a computer-assisted system to improve information flow that allows for A.) interchangeability of tools at each level, including the decomposition tool; B.) the shifting of the user's focus from independent tools to an information flow that is dynamic with feedback loops, iteration cycles, inclusion of outside commentary, and additional feedback loops; C.) continuous updating of the comprehension by other users based on a repetition of the process 1400 over time; and D.) tools becoming "invisible" from the user's perspective (as well as interchangeable).

The process 1400 may be repeated continuously over the course of time in which each result is based on a user contribution. Each result may be fed back as an input to process 1400. Thus, after each cycle of process 1400, the flow of information and level of comprehension improves over time.

Figure 15:
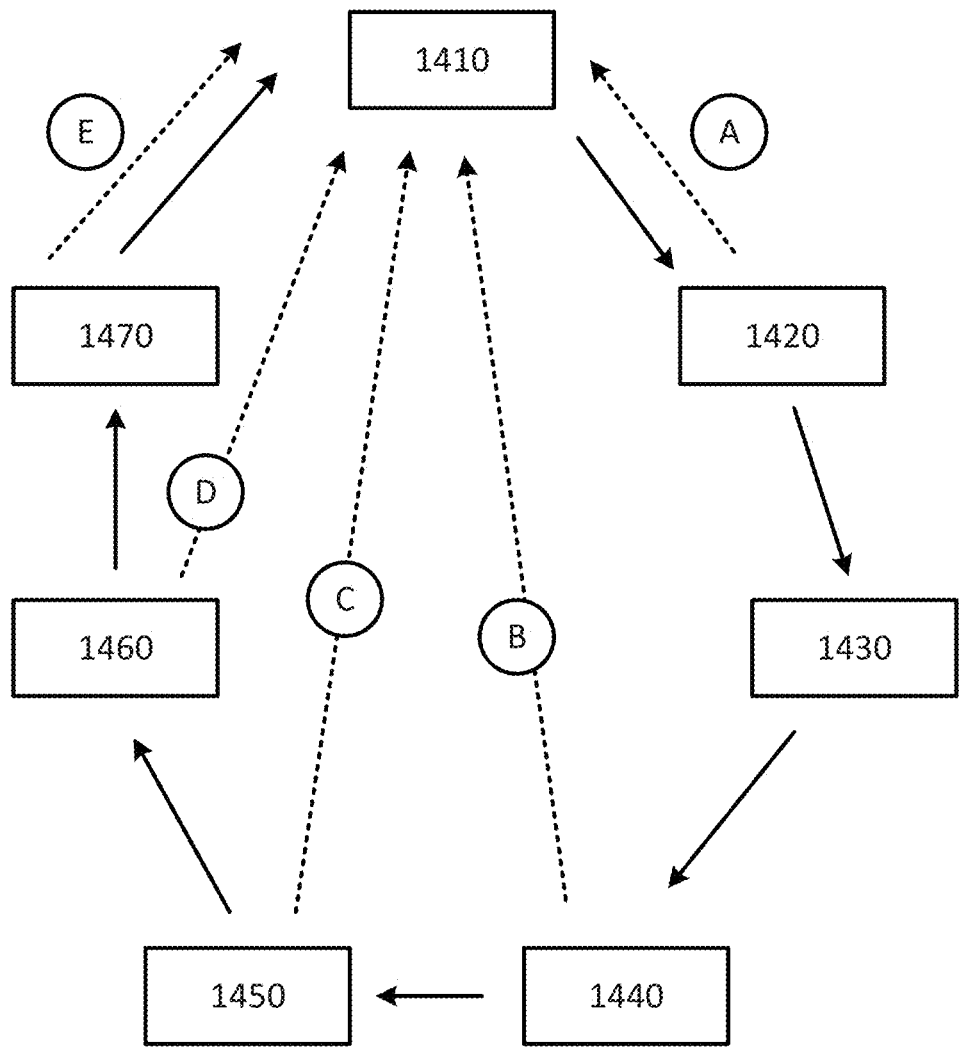
FIG. 15 illustrates an example flow diagram of data that may be fed back for refining the comprehension engine processes.

FIG. 15 illustrates an example flow diagram of data that may be fed back for refining the comprehension engine processes. As shown in FIG. 15, outputs from blocks in process 1400 may be input into other blocks in process 1500. For example, outputs from process block 1420 may include results list, which may be used to generate new keywords (e.g., query terms) which may be inputted into block 1410. Similarly, a knowledge fragment list from block 1440 may generate new keywords. In some embodiments, the analysis from block 1450 may generate new keywords. Additionally, or alternatively, user contributions, from block 1460, may generate new keywords. Also, exporting the final results (e.g., posting to social media, or a recipient of the final results export) may initiate new keywords.

Aspects of the present disclosure may be implemented in a variety of software platforms, tools, word processors, web browsers, etc. Thus, the systems and/or methods, described herein may be agnostic to which software tools the users choose to use. That is, aspects of the present disclosure may focus on information flow rather than tool selection, which may be a matter of user preference. Aspects of the present disclosure may provide a system of shifting user focus on disparate (and possibly disconnected) tools to a unified flow of information. Aspects of the present disclosure may provide a dynamic system of information uptake, comprehension, supplemented with user creativity, and exposure to other users for further comment, with each exported item being considered a step along an endless path of knowledge discovery. As an illustrative example for the purposes of further explanation, information may begin to appear like a motion picture, with a single user input being one frame. Each new user input may add one or more frames to the motion picture (e.g., information flow).

Figure 16:
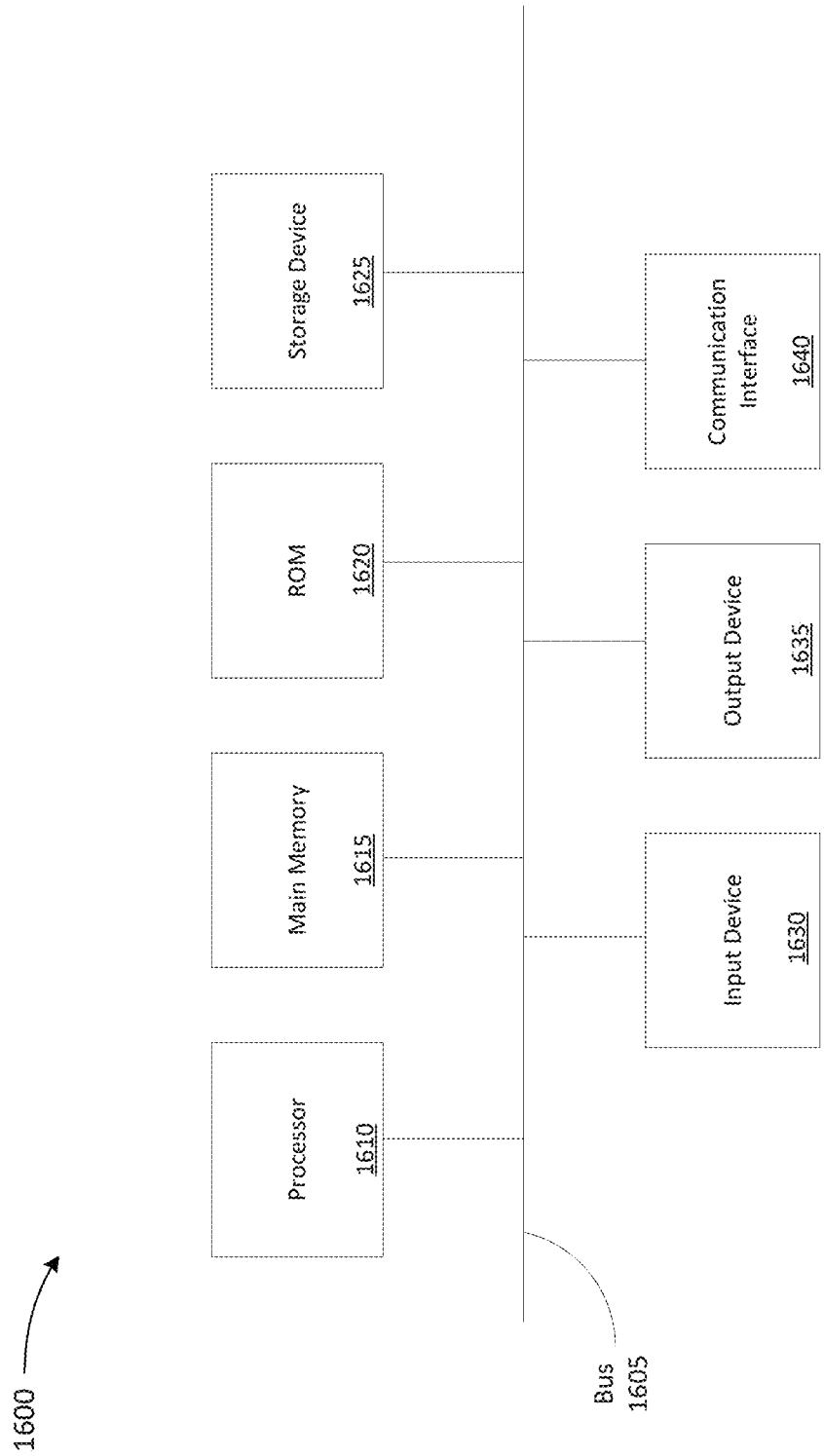
FIG. 16 illustrates example components of a computing device that may be used in accordance with aspects of the present disclosure.

FIG. 16 illustrates example components of a device 1600 that may be used in accordance with aspects of the present disclosure. Device 1600 may correspond to the client device 110 and/or the comprehension engine 120. Each of the client device 110 and/or the comprehension engine 120 may include one or more devices 1600 and/or one or more components of device 1600.

As shown in FIG. 16, device 1600 may include a bus 1605, a processor 1610, a main memory 1615, a read only memory (ROM) 1620, a storage device 1625, an input device 1630, an output device 1635, and a communication interface 1640.

Bus 1605 may include a path that permits communication among the components of device 1600. Processor 1610 may include a processor, a microprocessor, an application specific integrated circuit (ASIC), a field programmable gate array (FPGA), or another type of processor that interprets and executes instructions. Main memory 1015 may include a random access memory (RAM) or another type of dynamic storage device that stores information or instructions for execution by processor 1610. ROM 1620 may include a ROM device or another type of static storage device that stores static information or instructions for use by processor 1610. Storage device 1625 may include a magnetic storage medium, such as a hard disk drive, or a removable memory, such as a flash memory.

Input device 1630 may include a component that permits an operator to input information to device 1600, such as a control button, a keyboard, a keypad, or another type of input device. Output device 1635 may include a component that outputs information to the operator, such as a light emitting diode (LED), a display, or another type of output device. Communication interface 1640 may include any transceiver-like component that enables device 1600 to communicate with other devices or networks. In some implementations, communication interface 1640 may include a wireless interface, a wired interface, or a combination of a wireless interface and a wired interface. In embodiments, communication interface 1640 may receive computer readable program instructions from a network and may forward the computer readable program instructions for storage in a computer readable storage medium (e.g., storage device 1625).

Device 1600 may perform certain operations, as described in detail below. Device 1600 may perform these operations in response to processor 1610 executing software instructions contained in a computer-readable medium, such as main memory 1615. A computer-readable medium may be defined as a non-transitory memory device and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A memory device may include memory space within a single physical storage device or memory space spread across multiple physical storage devices.

The software instructions may be read into main memory 1615 from another computer-readable medium, such as storage device 1625, or from another device via communication interface 1640. The software instructions contained in main memory 1615 may direct processor 1610 to perform processes that will be described in greater detail herein. Alternatively, hardwired circuitry may be used in place of or in combination with software instructions to implement processes described herein. Thus, implementations described herein are not limited to any specific combination of hardware circuitry and software.

In some implementations, device 1600 may include additional components, fewer components, different components, or differently arranged components than are shown in FIG. 16.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may include a system, a method, and/or a computer program product at any possible technical detail level of integration. The computer program product may include a computer readable storage medium (or media) having computer readable program instructions thereon for causing a processor to carry out or execute aspects or processes of the present disclosure.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While the present disclosure has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the disclosure.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a computing system, at least one query term;
   executing, by the computing system in response to the receiving of the at least one query term, a query based on the received at least one query term;
   receiving, by the computing system, a selection of one or more documents from a query result produced by the executed query;
   processing, by the computing system, the selection of one or more documents to produce knowledge fragments at machine speed, the knowledge fragments capturing a relation between values of a first relatum and a second relatum;
   providing, by the computing system, a payload for each of the selected one or more documents for display, the payload being based on the produced knowledge fragments;
   executing, by the computing system, a sorting analysis visualization function on the payload for each of the selected one or more documents, the sorting analysis visualization function analyzing the payload and forming a visual network that models an interpretation of the payload; and
   presenting, by the computing system, the interpretation.

2. The method of claim 1, wherein the providing of the payload further comprises:
   decomposing, by the computing system, the selected one or more documents, the decomposing comprising the processing of the selection of the one or more documents to produce the knowledge fragments.

3. The method of claim 2, wherein the providing of the payload further comprises:
   outputting the knowledge fragments based on the decomposing of the selected one or more documents.

4. The method of claim 1, wherein a portion of the method is implemented by the computing system in at least one of a tool, a word processor and a web browser.

5. The method of claim 1, further comprising:
   receiving, by the computing system, a selection of one of a plurality of sorting analysis visualization presets; wherein:
   an executed visualization of the payload is based on the received selected one of the plurality of sorting analysis visualization presets.

6. The method of claim 1, wherein the providing of the payload comprises:
   generating JSON objects with notes for each of the selected one or more documents.

7. The method of claim 6, wherein:
   each of the JSON objects comprises a knowledge fragment including a respective first relatum, a respective second relatum, and a respective relation between the respective first relatum and the respective second relatum.

8. The method of claim 1, further comprising:
   receiving, by the computing system, user input regarding a produced visualization of one of the selected one or more documents; and
   producing, by the computing system, a new interpretation of the produced visualization of the one of the selected one or more documents for presentation in response to the receiving of the user input regarding the produced visualization.

9. The method of claim 1, further comprising:
   providing a word processor having access to knowledge provided by the sorting analysis visualization function based on the selected one or more documents.

10. The method of claim 1, wherein:
    the method is repeated continuously, a result of each cycle being based on user input for the each cycle, and
    the receiving of the at least one query term, the executing of the query, the receiving of the selection of the one or more documents from the query result, the processing of the selection of the one or more documents to produce the knowledge fragments at the machine speed, the providing of the payload for the each of the selected one or more documents, and the executing of the sorting analysis visualization function on the payload for the each of the selected one or more documents generating new query terms for a next cycle of the method.

11. A computing system comprising:
    at least one processor; and
    a memory connected with the at least one processor, wherein the memory includes instructions for the processor to perform operations, the operations comprising:
    receiving at least one query term,
    executing a query based on the received at least one query term,
    receiving a selection of one or more documents from a query result produced by the executed query,
    processing the selection of one or more documents to produce knowledge fragments at machine speed, the knowledge fragments capturing a relation between values of a first relatum and a second relatum,
    providing a payload for each of the selected one or more documents for display, the payload being based on the produced knowledge fragments,
    executing a sorting analysis visualization function on the payload for each of the selected one or more documents, the sorting analysis visualization function analyzing the payload and forming a visual network that models an interpretation of the payload, and
    presenting the interpretation.

12. The computing system of claim 11, wherein the operations further comprise:
    receiving a selection of one of a plurality of sorting analysis visualization presets, wherein the executing of the sorting analysis visualization function is based on the received selected one of the plurality of sorting analysis visualization presets.

13. The computing system of claim 11, wherein the payload for each of the selected one or more documents include JSON objects having a respective first relatum, a respective second relatum, and a respective relation between the first relatum and the second relatum.

14. The computing system of claim 11, wherein the operations further comprise:
  executing a visualization of the payload for each of the selected one or more documents, the executing of the visualization further comprises producing the visualization for each of the selected one or more documents, the visualization including a prime focus and a relatum having either a direct or indirect relation with the prime focus.

15. The computing system of claim 14, wherein the operations further comprise:
  receiving user input regarding the produced visualization of one of the selected one or more documents; and
  producing a new interpretation of the payload of the one of the selected one or more documents for presentation in response to the receiving of the user input regarding the produced visualization.

16. The computing system of claim 11, wherein the operations further comprise:
  providing a word processor with access to knowledge provided by the sorting analysis visualization function based on the selected one or more documents.

17. The computing system of claim 11, wherein:
  a sequence of the operations is continuously repeated, a result of each respective cycle of the sequence being based on user input provided during the respective cycle, and
  the receiving of the at least one query term, the executing of the query, the receiving of the selection of the one or more documents from the query result, the processing of the selection of the one or more documents to produce the knowledge fragments at the machine speed, the providing of the payload for the each of the selected one or more documents, and the executing of the sorting analysis visualization function on the payload for the each of the selected one or more documents generates new query terms for a next cycle of the sequence.

18. A non-transitory computer-readable storage medium having instructions recorded thereon for at least one processor of a computing device to be configured to perform operations, the operations comprising:
  receiving at least one query term,
  executing a query based on the received at least one query term,
  receiving a selection of one or more documents from a query result produced by the executed query,
  processing the selection of one or more documents to produce knowledge fragments at machine speed, the knowledge fragments capturing a relation between values of a first relatum and a second relatum,
  providing a payload for each of the selected one or more documents for display, the payload being based on the produced knowledge fragments,
  executing a sorting analysis visualization function on the payload for each of the selected one or more documents, the sorting analysis visualization function analyzing the payload and forming a visual network that models an interpretation of the payload,
  receiving user input regarding a visualization of one of the selected one or more documents;
  producing a new visualization of the one of the selected one or more documents based on the received user input regarding the visualization; and
  presenting the new visualization.

19. The non-transitory computer-readable storage medium of claim 18, wherein the operations further comprise:
  receiving a selection of one of a plurality of sorting analysis visualization presets, wherein the executing of the sorting analysis visualization function is based on the received selected one of the plurality of sorting analysis visualization presets.

20. The non-transitory computer-readable storage medium of claim 18, wherein the payload for each of the selected one or more documents includes a plurality of knowledge fragments, each of the knowledge fragments including JSON objects having a respective first relatum, a respective second relatum, and a respective relation between the respective first relatum and the respective second relatum.

21. The non-transitory computer-readable medium of claim 18, wherein the operations further comprise:
  executing a visualization of the payload for one of the selected one or more documents, the visualization including a prime focus and a relatum having either a direct or indirect relation with the prime focus.

22. The non-transitory computer-readable medium of claim 18, wherein the operations further comprise:
  providing a word processor having access to knowledge provided by the sorting analysis visualization function based on one of the selected one or more documents.

23. The non-transitory computer-readable storage medium of claim 18, wherein:
  a sequence of the operations is continuously repeated, a result of each respective cycle of the sequence being based on user input provided during the respective cycle, and
  the receiving of the at least one query term, the executing of the query, the receiving of the selection of the one or more documents from the query result, the processing of the selection of the one or more documents to produce the knowledge fragments at the machine speed, the providing of the payload for the each of the selected one or more documents, and the executing of the sorting analysis visualization function on the payload for the each of the selected one or more documents generates new query terms for a next cycle of the sequence.

24. A method comprising:
  receiving, by a computing system, at least one selected document;
  processing, by the computing system, the at least one selected document to produce knowledge fragments at machine speed, the knowledge fragments capturing a relation between values of a first relatum and a second relatum;
  providing, by the computing system, a payload for each of the at least one selected document for display, the payload being based on the produced knowledge fragments;
  executing, by the computing system, a sorting analysis visualization function on the payload for each of the at least one selected document, the sorting analysis visualization function analyzing the payload and forming a visual network that models an interpretation of the payload; and
  presenting, by the computing system, the interpretation.

* * * * *